(12) United States Patent
Yamamoto

(10) Patent No.: US 9,127,931 B2
(45) Date of Patent: Sep. 8, 2015

(54) THICKNESS-INFORMATION ACQUISITION APPARATUS, THICKNESS-INFORMATION ACQUISITION METHOD, THICKNESS-INFORMATION ACQUISITION PROGRAM AND MICROSCOPE

(75) Inventor: Takashi Yamamoto, Tokyo (JP)

(73) Assignee: Sony Corporation, Tokyo (JP)

(*) Notice: Subject to any disclaimer, the term of this patent is extended or adjusted under 35 U.S.C. 154(b) by 420 days.

(21) Appl. No.: 12/970,088

(22) Filed: Dec. 16, 2010

(65) Prior Publication Data

US 2011/0157348 A1 Jun. 30, 2011

(30) Foreign Application Priority Data

Dec. 25, 2009 (JP) ................. P2009-295380

(51) Int. Cl.
G01B 11/00 (2006.01)
G01B 11/06 (2006.01)
G01B 9/04 (2006.01)
G02B 21/14 (2006.01)

(52) U.S. Cl.
CPC *G01B 11/06* (2013.01); *G01B 9/04* (2013.01); *G02B 21/14* (2013.01)

(58) Field of Classification Search
CPC ...................................... G06K 9/00
USPC .......... 348/139, 47, 50, E7.08; 382/190, 192, 382/194, 195, 205, 209, 217–220, 224, 225, 382/254, 276
See application file for complete search history.

(56) References Cited

U.S. PATENT DOCUMENTS

| 2004/0070822 A1* | 4/2004 | Shioda et al. ............... 359/372 |
| 2008/0002878 A1* | 1/2008 | Meiyappan ................. 382/154 |
| 2008/0055412 A1* | 3/2008 | Tanaka ...................... 348/159 |

FOREIGN PATENT DOCUMENTS

| JP | 04-020190   | 1/1992 |
| JP | 05-127068   | 5/1993 |
| JP | 05-181056   | 7/1993 |
| JP | 06-265349   | 9/1994 |
| JP | 11-133309   | 5/1999 |
| JP | 2009-175334 | 8/2009 |

OTHER PUBLICATIONS

Morvan, phd Thesis, "Acquisition, Compression and Rendering of Depth and Texture for Multi-View Video", Eindhoven : Technische Universiteit Eindhoven, 2009. A catalogue record is available from the Eindhoven University of Technology Library ISBN: 978-90-386-1682-7Jun. 9, 2009.*

(Continued)

*Primary Examiner* — Jay Patel
*Assistant Examiner* — Frank Huang
(74) *Attorney, Agent, or Firm* — K&L Gates LLP

(57) ABSTRACT

A thickness-information acquisition apparatus includes: an image acquisition section configured to acquire a phase-difference image of a sample; a correlation-distribution computation section configured to compute a correlation distribution of an image in the phase-difference image with respect to pixels of another image in the phase-difference image; and a thickness-information acquisition section configured to acquire information on the thickness of the sample in accordance with the correlation distribution.

11 Claims, 9 Drawing Sheets

(56) References Cited

OTHER PUBLICATIONS

Vertex, website: http://earthmath.kennesaw.edu/main_site/review_topics/vertex_of_parabola.htm, retrieved Mar. 8, 2008.*
Galbraith, "The Optical Measurement of Depth", Quarterly Journal of Microscopical Science, 1955, p. 285, section introduction.*
http://en.wikipedia.org/wiki/Focus_stacking, accessed Dec. 7, 2008.*
Roysam et al. "Automated Three-Dimensional Image Analysis Methods for Confocal Microscopy"; Handbook of Biological Confocal Microscopy, 2006.*
Japanese Patent Office, Grounds for refusal notice issued in connection with Japanese Patent Application No. 2009-295380, dated Sep. 3, 2013. (4 pages).

* cited by examiner

FIG.6A
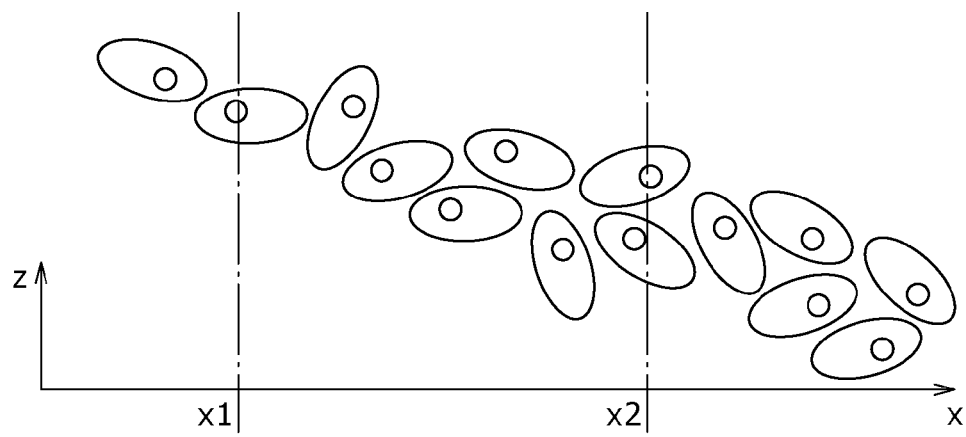
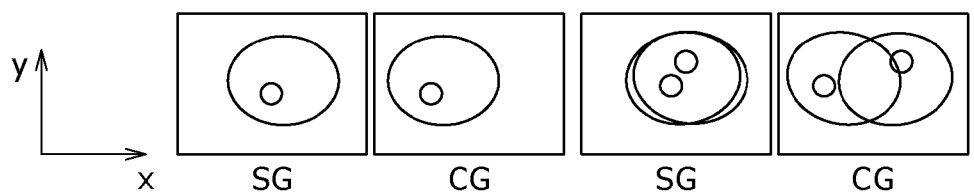
FIG.6B    FIG.6C
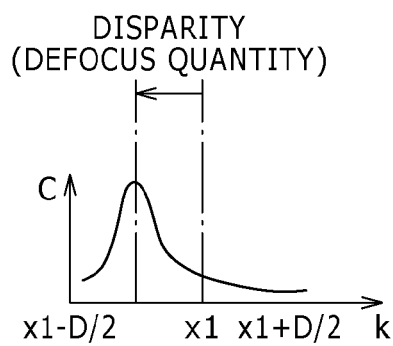
FIG.6D
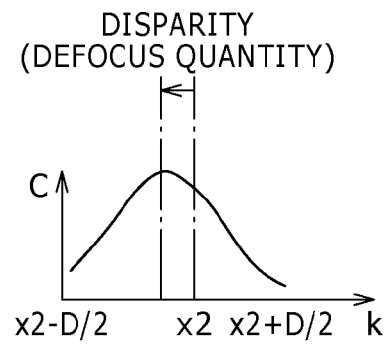
FIG.6E

THICKNESS-INFORMATION ACQUISITION APPARATUS, THICKNESS-INFORMATION ACQUISITION METHOD, THICKNESS-INFORMATION ACQUISITION PROGRAM AND MICROSCOPE

CROSS REFERENCES TO RELATED APPLICATIONS

The present application claims priority to Japanese Priority Patent Application JP 2009-295380 filed in the Japan Patent Office on Dec. 25, 2009, the entire content of which is hereby incorporated by reference.

BACKGROUND

The present application relates to a thickness-information acquisition apparatus, a thickness-information acquisition method adopted by the thickness-information acquisition apparatus, a thickness-information acquisition program for implementing the thickness-information acquisition method and a microscope employing the thickness-information acquisition apparatus.

In pathology, a biological sample such as a tissue segment is fixed on a piece of slide glass and subjected to a dyeing process as well as an inclusion process in order to make the sample which can be used as a prepared tissue slide of a microscope. In general, if the storage period of the prepared tissue slide serving as a biological sample is long, the visibility of the prepared tissue slide to the microscope deteriorates due to causes such as deterioration of the biological sample and the color degradation of the sample. In addition, in some cases, the prepared tissue slide of a microscope is examined microscopically at a facility outside a hospital (or another facility) at which the prepared tissue slide has been typically made. In such cases, the prepared tissue slide is delivered from the hospital (or the other facility) to the facility outside the hospital (or the other facility) generally by post. Thus, it takes certain time to deliver the prepared tissue slide.

In order to solve the problems described above, there has been proposed an apparatus for keeping image data of a biological sample. For more information on the proposed apparatus, the reader is advised to refer to documents such as Japanese Patent Laid-open No. 2009-175334.

SUMMARY

Incidentally, every biological sample has thickness. Thus, when the image of each thickness-direction area of a biological sample is taken for example, the number of thickness-direction areas whose images are to be taken is determined on the basis of the picture taking subject depth of an objective lens focusing light on the biological sample and the thickness of the biological sample.

The amount of data representing the taken images and the image taking time required to take the images are determined in accordance with the number of thickness-direction areas whose images are to be taken. From the data-amount determination point of view and the image-taking-time determination point of view, it is desirable to acquire information on the thickness of a biological sample. In the following description, the information on the thickness of a biological sample is also referred to simply as thickness information.

For example, the image taking operation is carried out by adoption of a conceivable method described as follows. First of all, the focal point of the optical lens is shifted in the thickness direction of the biological sample by a distance interval determined in advance. At every focal point, the image of the biological sample is then taken in order to determine whether or not the biological sample exists at a position corresponding to the focal point. In this way, the thickness information of the biological sample can be acquired.

In the method described above, as an example, let the picture taking subject depth of an objective lens focusing light on the biological sample be 1 μm and let the thickness of the biological sample to be searched in the thickness direction be 100 μm. In this case, the thickness information of the biological sample is acquired from 100 taken images and the detection precision is determined by a unit of 1 μm.

As another example, on the other hand, let the picture taking subject depth of an objective lens focusing light on the biological sample be 2 μm and let the thickness of the biological sample to be searched in the thickness direction be 100 μm. In this case, the thickness information of the biological sample is acquired from 50 taken images and the detection precision is determined by a unit of 2 μm.

Thus, in accordance with the method described above, for a small picture taking subject depth of the objective lens focusing light on the biological sample, the detection precision is high but the time it takes images of the biological sample is long. For a large picture taking subject depth of the objective lens focusing light on the biological sample, on the other hand, the detection precision is low but the time it takes images of the biological sample is short. That is to say, it is difficult to reduce the time required to detect images of the biological sample and, at the same time, raise the detection precision.

Addressing the problems described above, inventors of the present application have proposed a thickness-information acquisition apparatus capable of acquiring thickness information of a biological sample in a short period of time and with a high degree of precision, proposed a thickness-information acquisition method to be adopted by the thickness-information acquisition apparatus and proposed a thickness-information acquisition program for implementing the thickness-information acquisition method. The inventors of the present application have also proposed a microscope that employs the thickness-information acquisition apparatus.

In order to solve the problems described above, according to an embodiment, there is provided a thickness-information acquisition apparatus including:

an image acquisition section configured to acquire the phase-difference image of a sample;

a correlation-distribution computation section configured to compute a correlation distribution of an image in the phase-difference image with respect to pixels of another image in the phase-difference image; and a thickness-information acquisition section configured to acquire information on the thickness of the sample in accordance with the correlation distribution.

In addition, according to another embodiment, there is provided a thickness-information acquisition method including the steps of:

acquiring a phase-difference image of a sample;

computing a correlation distribution of an image in the phase-difference image with respect to pixels of another image in the phase-difference image; and acquiring information on the thickness of the sample in accordance with the correlation distribution.

On top of that, according to a further embodiment, there is provided a thickness-information acquisition program to be executed by a computer to carry out:

an image acquisition step of acquiring a phase-difference image of a sample;

a computation step of computing a correlation distribution of an image in the phase-difference image with respect to pixels of another image in the phase-difference image; and a thickness-information acquisition step of acquiring information on the thickness of the sample in accordance with the correlation distribution.

In addition, according to yet another embodiment, there is provided a microscope including:

a mirror for splitting incident light coming from an objective lens into transmitted light propagating through the transmission side of the mirror and reflected light propagating through the reflection side of the mirror;

a first image taking device for taking an image projected by the objective lens on the transmission side of the mirror or the reflection side of the mirror to serve as an image of a picture taking subject so as to let the objective lens create the image of the picture taking subject on the first image taking device;

a pair of apertures provided behind the mirror at positions on the reflection side of the mirror or positions on the transmission side of the mirror to serve as a unit consisting of the apertures whose sizes can be adjusted so as to provide a picture taking subject depth greater than the picture taking subject depth of the objective lens;

separator lenses provided behind the apertures respectively at positions on the reflection side of the mirror or positions on the transmission side of the mirror to serve as separator lenses for creating a phase-difference image of a sample for a planned created image surface of the picture taking subject image projected by the objective lens on the reflection side of the mirror or the transmission side of the mirror;

a second image taking device for making use of the planned created image surface as an image taking surface;

an image acquisition section configured to acquire the phase-difference image of the sample from the second image taking device;

a correlation-distribution computation section configured to compute a correlation distribution of an image in the phase-difference image with respect to pixels of another image in the phase-difference image; and a thickness-information acquisition section configured to acquire information on the thickness of the sample in accordance with the correlation distribution.

As described above, a correlation distribution of an image in the phase-difference image of a sample with respect to pixels of a reference image in the phase-difference image is computed whereas information on the thickness of the sample is acquired in accordance with the correlation distribution. Thus, information on the thickness of the sample in an image taking range can be acquired from one phase-difference image. In addition, the information on the thickness of the sample can be acquired in accordance with a correlation distribution which reflects the thickness of the sample.

As described above, in accordance with the present application, a correlation distribution of an image in the phase-difference image of a sample with respect to pixels of a reference image in the phase-difference image is computed whereas information on the thickness of the sample is acquired in accordance with the correlation distribution. Thus, information on the thickness of the sample in an image taking range can be acquired from one phase-difference image. In addition, the information on the thickness of the sample can be acquired in accordance with a correlation distribution which reflects the thickness of the sample. As a result, it is possible to acquire thickness information of a biological sample in a short period of time and with a high degree of precision.

Additional features and advantages are described herein, and will be apparent from the following Detailed Description and the figures.

BRIEF DESCRIPTION OF THE FIGURES

FIGS. 6A to 6E are a plurality of diagrams roughly showing a correlation distribution according to the thickness of a tissue segment;

DETAILED DESCRIPTION

Embodiments of the present application will be described below in detail with reference to the drawings. It is to be noted that the explanation of the embodiments is divided into two chapters which are arranged in the following order.

1. Embodiment
2. Other Embodiments

1. Embodiment 1-1. Configuration of Microscope

Figure 1:
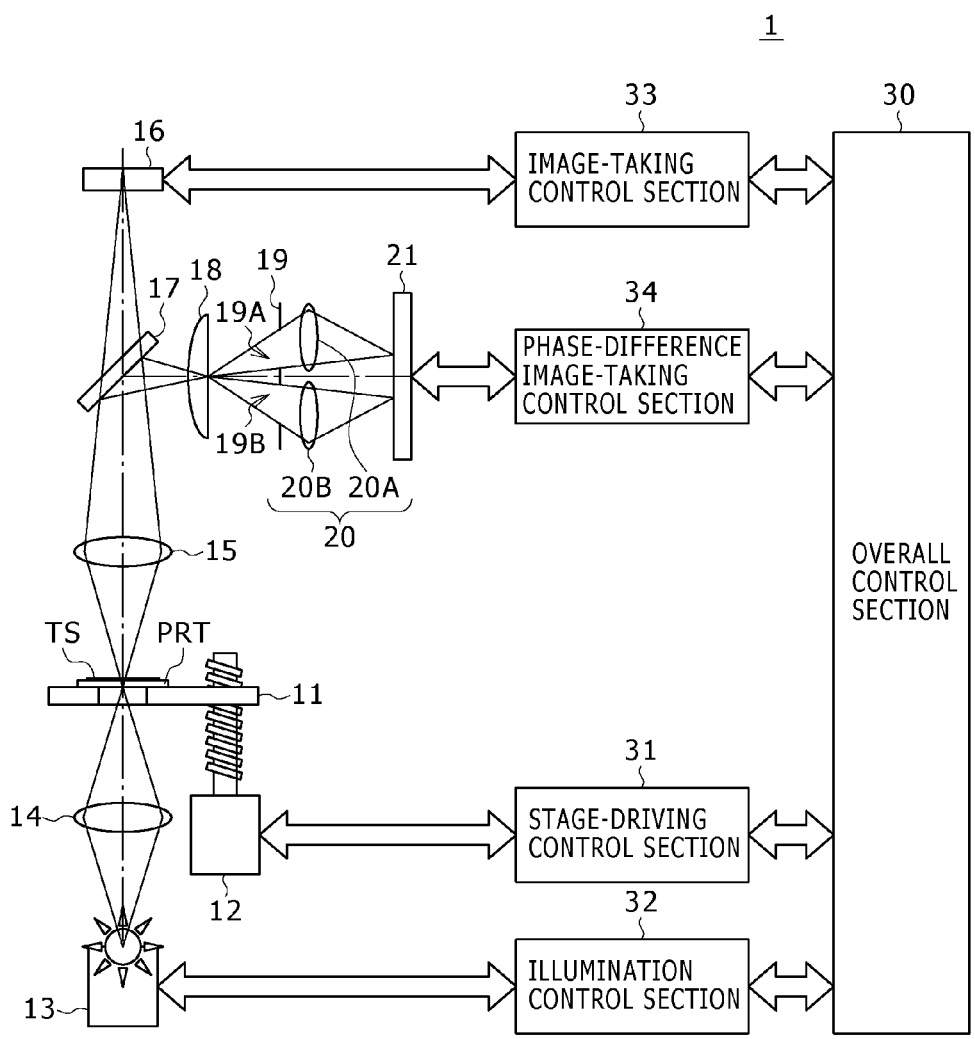
FIG. 1 is a diagram roughly showing the configuration of a microscope.

FIG. 1 is a diagram roughly showing the configuration of a microscope 1 according to an embodiment. As shown in this diagram, the microscope 1 has a planar stage 11 on which a prepared tissue slide PRT is mounted.

The prepared tissue slide PRT is fixed on a slide glass by adoption of a fixing technique determined in advance. The prepared tissue slide PRT includes a tissue segment TS which is typically a junction tissue such as blood, an epithelium tissue or a combination of the junction tissue and the epithelium tissue. If necessary, the tissue segment TS is subjected to a dyeing process. The dyeing process is by no means limited to the so-called ordinary dyeing process, but can also be a dyeing process which is referred to as a special dyeing process such as dyeing process based on a FISH (Fluorescence In-Situ Hybridization) or an enzyme antibody method. Representative examples of the so-called ordinary dyeing process are an HE (Hematoxylin Eosin) dyeing process, a giemsa dyeing process and a Papanicolaou dyeing process.

The stage 11 is linked to a stage driving mechanism 12. The stage driving mechanism 12 is a section for driving the stage 11 in directions parallel to the surface of the stage 11 and a direction perpendicular to the surface of the stage 11. The directions parallel to the surface of the stage 11 are the direction of the X and Y axes whereas the direction perpendicular to the surface of the stage 11 is the direction of the Z axis. Incidentally, a PRT (prepared tissue slide) location surface is a portion of the surface of the stage 11. The PRT (prepared tissue slide) location surface is a surface on a side on which the prepared tissue slide PRT is provided. In general, on the PRT (prepared tissue slide) location surface, a PRT holding section is provided. The PRT holding section is a member for holding the prepared tissue slide PRT at position determined in advance. It is to be noted that the PRT holding section itself is not shown in the diagram which serves as FIG. 1.

On a side opposite to the side of the PRT (prepared tissue slide) location surface with respect to the stage 11, a light source 13 is provided. The light source 13 is capable of radiating light for illuminating a tissue segment TS already subjected to an ordinary dyeing process as well as light for illuminating a tissue segment TS already subjected to a special dyeing process and capable of changing the light for illuminating a tissue segment TS already subjected to an ordinary dyeing process to the light for illuminating a tissue segment TS already subjected to a special dying process or vice versa. In the following description, the light for illuminating a tissue segment TS already subjected to an ordinary dyeing process is referred to as bright visual-field illumination light whereas the light for illuminating a tissue segment TS already subjected to a special dyeing process is referred to as dark visual-field illumination light. It is also possible, however, to provide a configuration in which the light source 13 is capable of radiating only the bright visual-field illumination light or the dark visual-field illumination light. Between the light source 13 and the stage 11, a condenser lens 14 is provided. The condenser lens 14 is located at a position on the light propagation upstream side with respect to the PRT (prepared tissue slide) location surface. The optical axis of the condenser lens 14 is a line which is perpendicular to the PRT (prepared tissue slide) location surface and passes through the reference position of the PRT (prepared tissue slide) location surface.

In the following description, a position on the light propagation upstream side with respect to a member is referred to as a position in front of the member whereas a position on the light propagation downstream side with respect to a member is referred to as a position behind the member. Thus, the condenser lens 14 is located at a position in front of the PRT (prepared tissue slide) location surface.

An objective lens 15 having a magnifying power determined in advance is located at a position behind the PRT (prepared tissue slide) location surface. The optical axis of the objective lens 15 is a line which is perpendicular to the PRT (prepared tissue slide) location surface and passes through the reference position of the PRT (prepared tissue slide) location surface. Behind the objective lens 15, an image taking device 16 is provided. The main image creation surface of the objective lens 15 serves as the image taking surface of the image taking device 16.

The microscope 1 also includes a half mirror 17 provided at a position between the objective lens 15 and the image taking device 16 both located on the line which is perpendicular to the PRT (prepared tissue slide) location surface and passes through the reference position of the PRT (prepared tissue slide) location surface. The half mirror 17 is a mirror for splitting incident light coming from the objective lens 15 into transmitted light propagating through a transmission side of the objective lens 15 and reflected light propagating through a reflection side of the objective lens 15.

A field lens 18 is provided behind the half mirror 17 at a position on the reflection side of the half mirror 17. The field lens 18 is a lens for relaying a picture taking subject image projected by the objective lens 15 on the reflection side of the half mirror 17 to members behind the field lens 18. In the following description, the picture taking subject image projected by the objective lens 15 on the reflection side of the half mirror 17 is referred to as a planned created image. Since the objective lens 15 focuses light of the picture taking subject on the field lens 18 through the half mirror 17, reduction of the brightness in the visual-field surroundings is avoided.

A diaphragm mask 19 is provided behind the field lens 18. The diaphragm mask 19 has a pair of apertures 19A and 19B which are provided on a surface perpendicular to the optical axis of the field lens 18. The positions of the apertures 19A and 19B are symmetrical with respect to the optical axis which also serves as a boundary between the positions of the apertures 19A and 19B. The sizes of the apertures 19A and 19B are adjusted so as to make the picture taking subject depths of separator lenses 20A and 20B greater than the picture taking subject depths of the objective lens 15.

The apertures 19A and 19B of the diaphragm mask 19 divide an incident picture taking subject light beam coming from the field lens 18 into two split light beams. The split light beams intersect with each other at an image creation surface of the picture taking subject light beam so that the relation between the positions of the split light beams in front of the image creation surface is opposite to the relation between the positions of the split light beams behind the image creation surface.

The separator lenses 20A and 20B are individually provided behind respectively the apertures 19A and 19B which form an aperture pair as described above. The separator lenses 20A and 20B shift the split beams output by the apertures 19A and 19B respectively in order to create a set of picture taking subject images for a planned created image relayed by the field lens 18. In the following description, the set of picture taking subject images for a planned created image relayed by the field lens 18 is referred to as a phase-difference image.

It is to be noted that, if the separator lenses 20A and 20B cross the diametrical vignetting boundary of the field lens 18, portions of spilt beams are lost. In order to prevent portions of spilt beams from being lost, the separator lenses 20A and 20B are shifted toward the center of the field lens 18 so that the separator lenses 20A and 20B do not cross the diametrical vignetting boundary of the field lens 18.

An image taking device 21 is not a line sensor. Instead, the image taking device 21 is an area sensor making use of the planned created image surface of a picture taking subject image, which is relayed by the field lens 18, as an image taking surface.

Figure 2:
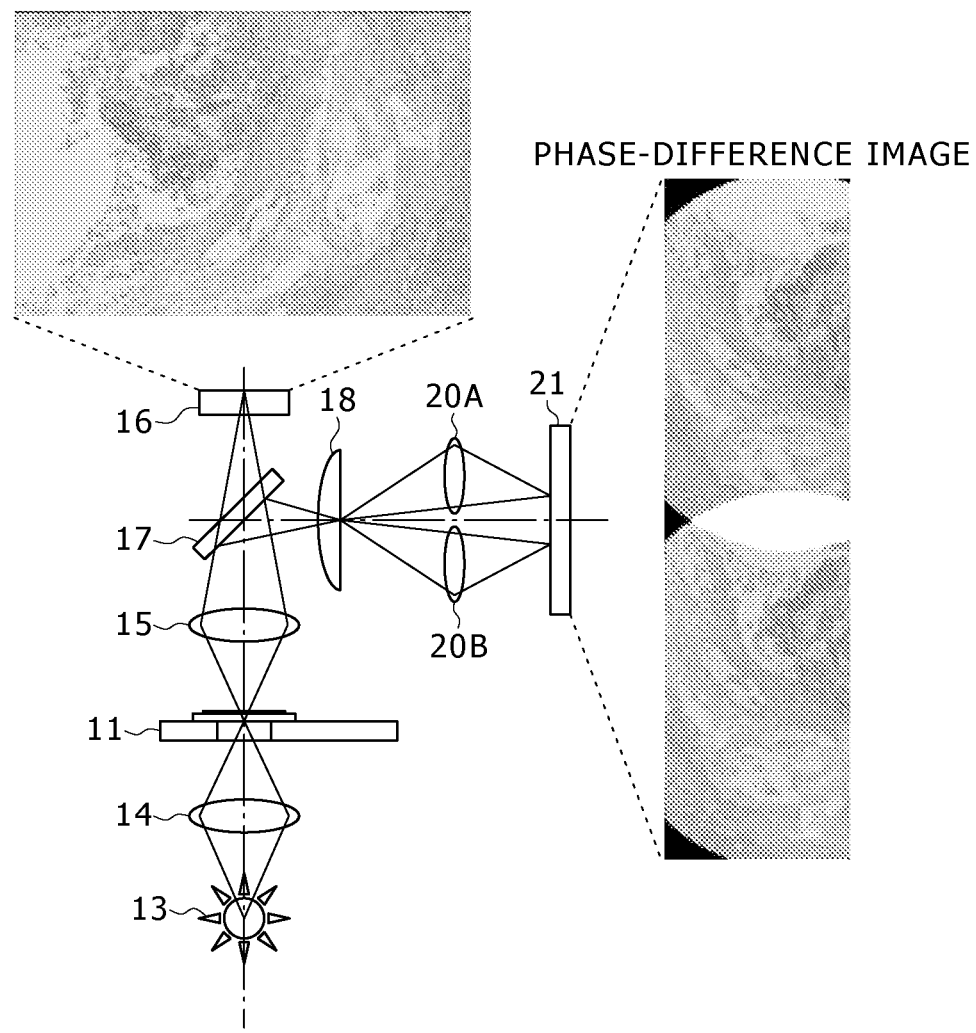
FIG. 2 is a diagram showing a picture taking subject image and a phase-difference image of a tissue segment.

FIG. 2 is a diagram showing a picture taking subject image and a phase-difference image of a tissue segment which serves as the picture taking subject. The picture taking subject image is a bright visual-field image created on the image taking device 16, which is provided on the main image creation surface of the objective lens 15, as a result of an image taking operation. On the other hand, the phase-difference image is images created on the image taking device 21, which is provided on the planned created image surface of the objective lens 15, as a result of the image taking operation. As is also obvious from FIG. 2, the bright visual-field image created on the main image creation surface serving as the image taking surface of the image taking device 16 is also created by the separator lenses 20A and 20B on the planned created image surface, which serves as the image taking surface of the image taking device 21, as a phase-difference image.

A control system included in the microscope 1 has a stage-driving control section 31 provided for the stage driving mechanism 12, an illumination control section 32 provided for the light source 13, an image-taking control section 33 provided for the image taking device 16 and a phase-difference image-taking control section 34 provided for the image taking device 21. The stage-driving control section 31, the illumination control section 32, the image-taking control section 33 and the phase-difference image-taking control section 34 are connected to each other by data communication paths.

In the control system, each of the stage-driving control section 31, the illumination control section 32, the image-taking control section 33 and the phase-difference image-taking control section 34 is a computer which includes a CPU (Central Processing Unit), a ROM (Read Only Memory), a RAM (Random Access Memory) used as a work memory of the CPU and processing circuits.

The stage-driving control section 31 is a section for driving and controlling the stage driving mechanism 12. In accordance with the driving and control operations carried out by the stage-driving control section 31, the stage driving mechanism 12 moves the stage 11 in stage surface directions in a scan operation in order to move the tissue segment TS fixed on the prepared tissue slide PRT to a location at which the condenser lens 14 focuses light emitted by the light source 13. In this specification of the application, the stage surface directions are also referred to as the directions of the X and Y axes.

In addition, the stage-driving control section 31 also drives and controls the stage driving mechanism 12 in order to move the stage 11 in a direction other than the stage surface directions. To put it detail, in accordance with the driving and control operations carried out by the stage-driving control section 31, the stage driving mechanism 12 moves the stage 11 in a direction perpendicular to the surface of the stage 11 in order to move a member of the tissue segment TS fixed on the prepared tissue slide PRT placed at the location, at which the condenser lens 14 focuses light emitted by the light source 13 as described above, to a position coinciding with the focal-distance point of the objective lens 15. In this specification of the application, the direction perpendicular to the surface of the stage 11 is also referred to as the direction of an Z axis and the direction of the Z axis is the thickness direction of the tissue segment TS.

The illumination control section 32 is a section for setting parameters according to a mode for acquiring a bright visual-field image or a mode for acquiring a dark visual-field image in the light source 13 in order to let the light source 13 radiate illumination light to the condenser lens 14 in the mode. In the following description, the mode for acquiring a bright visual-field image is referred to as a bright visual-field mode whereas the mode for acquiring a dark visual-field image is referred to as a dark visual-field mode. The parameters typically include a parameter used for specifying the strength of the illumination light and a parameter used for selecting a type of the light source 13.

It is to be noted that, in general, the illumination light radiated by the light source 13 in the bright visual-field mode is visible light. On the other hand, the illumination light radiated by the light source 13 in the dark visual-field mode is generally light including components each having a wavelength for exciting a fluorescent marker which is used in the special dyeing process. In addition, in the dark visual-field mode, background portions for the fluorescent marker are cut out.

The condenser lens 14 focuses the illumination light radiated by the light source 13 to the condenser lens 14 on the reference position of the PRT (prepared tissue slide) location surface on the stage 11. That is to say, the tissue segment TS fixed on the prepared tissue slide PRT includes a focused-light portion on which the condenser lens 14 focuses the illumination light radiated by the light source 13. An enlarged image of the focused-light portion on the tissue segment TS fixed on the prepared tissue slide PRT is created on the image creation surface of the objective lens 15. The objective lens 15 creates the image of a picture taking subject on the image taking surface of the image taking device 16 from the enlarged image of the focused-light portion on the tissue segment TS fixed on the prepared tissue slide PRT. At the same time, the half mirror 17 also reflects the image of a picture taking subject to the separator lenses 20A and 20B by way of the field lens 18 and the diaphragm mask 19. The separator lenses 20A and 20B create a phase-difference image on the image taking surface of the image taking device 21 from the picture taking subject image reflected by the half mirror 17. As described earlier, the image taking surface of the image taking device 21 is referred to as the planned created image surface.

The image-taking control section 33 is a section for setting parameters according to the bright visual-field mode or the dark visual-field mode in the image taking device 16 and for acquiring data of a picture taking subject image created on the image taking surface of the image taking device 16. The parameters typically include a parameter used for specifying a timing to start an exposure operation and a parameter used for specifying a timing to end an exposure operation.

The phase-difference image-taking control section 34 is a section for setting parameters according to the bright visual-field mode or the dark visual-field mode in the image taking device 21 and for acquiring data of a phase-difference image created on the image taking surface of the image taking device 21. The parameters typically include a parameter used for specifying a timing to start an exposure operation and a parameter used for specifying a timing to end an exposure operation.

Incidentally, the microscope 1 employs a control section 30 for executing the overall control of the microscope 1. That is why this control section is also referred to as the overall control section 30 in the following description. The overall control section 30 is connected to the stage-driving control section 31, the illumination control section 32, the image-taking control section 33 and the phase-difference image-taking control section 34 by data communication paths. The overall control section 30 is a computer employing a CPU, a ROM, a RAM, processing circuits and an HDD (Hard Disk Drive).

The overall control section 30 is put in a state of waiting for an instruction to start a bright visual-field mode or a dark visual-field mode. As the overall control section 30 receives such a start instruction, the overall control section 30 gives a command to start control executed in the mode specified by the instruction to the stage-driving control section 31, the illumination control section 32, the image-taking control section 33 and the phase-difference image-taking control section 34.

Each time the stage driving mechanism 12 moves the stage 11 in a direction perpendicular to the surface of the stage 11 in order to move a member of the tissue segment TS fixed on the prepared tissue slide PRT to a position coinciding with the focal-distance point of the objective lens 15, the overall control section 30 stores data acquired by the image taking device 16 as data of an enlarge image for the member of the tissue segment TS in a storage medium.

Then, the overall control section 30 is put in a state of waiting for a display instruction. As the overall control section 30 receives a display instruction, the overall control section 30 reads out data of an enlarged image specified by the display instruction and transfers the data to the originator of the display instruction.

As described above, the microscope 1 stores the data of an enlarge image for the tissue segment TS fixed on the prepared tissue slide PRT in a storage medium as an image of a detected state so that, in comparison with a configuration in which the prepared tissue slide PRT itself is stored, the microscope 1 is capable of storing information on the tissue segment TS of the prepared tissue slide PRT for a long period of time during which the position of the prepared tissue slide PRT serving as a sample may change and/or the sample state such as the dyeing state may deteriorate.

1-2. Thickness-Information Acquisition Processing

A thickness-information acquisition program has been stored in the HDD employed in the overall control section 30. The thickness-information acquisition program is a program to be executed by the CPU employed in the overall control section 30 to acquire information on the thickness of the tissue segment TS.

When the overall control section 30 receives a command to execute the thickness-information acquisition program, the overall control section 30 loads the program from the HDD to the RAM also employed in the overall control section 30 and carries out thickness-information acquisition processing by execution of the program.

Figure 3:
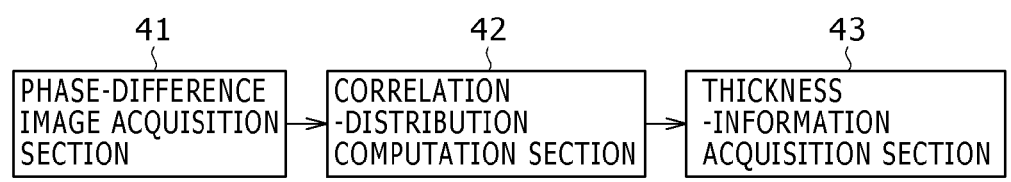
FIG. 3 is a block diagram roughly showing the functional configuration of an overall control section.

While the overall control section 30 is executing the thickness-information acquisition program, the overall control section 30 functions as a phase-difference image acquisition section 41, a correlation-distribution computation section 42 and a thickness-information acquisition section 43 which are shown in a block diagram serving as FIG. 3.

The phase-difference image acquisition section 41 is a section for driving the stage-driving control section 31. As described earlier, the stage-driving control section 31 is a section for driving and controlling the stage driving mechanism 12. In accordance with the driving and control operations carried out by the stage-driving control section 31, the stage driving mechanism 12 moves the stage 11 in stage surface directions in a scan operation in order to move a member of the tissue segment TS fixed on the prepared tissue slide PRT to a location at which a condenser lens 14 focuses light emitted by the light source 13. In this specification of the application, the stage surface directions are also referred to as the directions of the X and Y axes. In addition, also as described earlier, the stage-driving control section 31 also drives and controls the stage driving mechanism 12 in order to move the stage 11 in a direction other than the stage surface directions. To put it detail, in accordance with the driving and control operations carried out by the stage-driving control section 31, the stage driving mechanism 12 moves the stage 11 in a direction perpendicular to the surface of the stage 11 in order to move the member of the tissue segment TS fixed on the prepared tissue slide PRT placed at the location, at which the condenser lens 14 focuses light emitted by the light source 13 as described above, to a position coinciding with the focal-distance point of the objective lens 15. In this specification of the application, the direction perpendicular to the surface of the stage 11 is also referred to as the direction of an Z axis and the direction of the Z axis is the thickness direction of the tissue segment TS.

In addition, the phase-difference image acquisition section 41 also drives the illumination control section 32. As described earlier, the illumination control section 32 is a section for setting parameters according to a bright visual-field mode or a dark visual-field mode in the light source 13 in order to let the light source 13 radiate illumination light to the condenser lens 14 in the mode.

On top of that, the phase-difference image acquisition section 41 also drives the phase-difference image-taking control section 34. As described earlier, the phase-difference image-taking control section 34 is a section for setting parameters according to the bright visual-field mode or the dark visual-field mode in the image taking device 21 and for acquiring data of a phase-difference image which has been created on the image taking surface of the image taking device 21 from an enlarged image of a member of the tissue segment TS fixed on the prepared tissue slide PRT.

In the microscope 1, the apertures 19A and 19B are set in such a way that the picture taking subject depth of each of the separator lenses 20A and 20B has a value which is sufficiently greater than the thickness of the tissue segment TS fixed on the prepared tissue slide PRT. Thus, the phase-difference image acquisition section 41 acquires a phase-difference image created in an in-focus state for the entire thickness direction in the member of the tissue segment TS.

Figure 4:
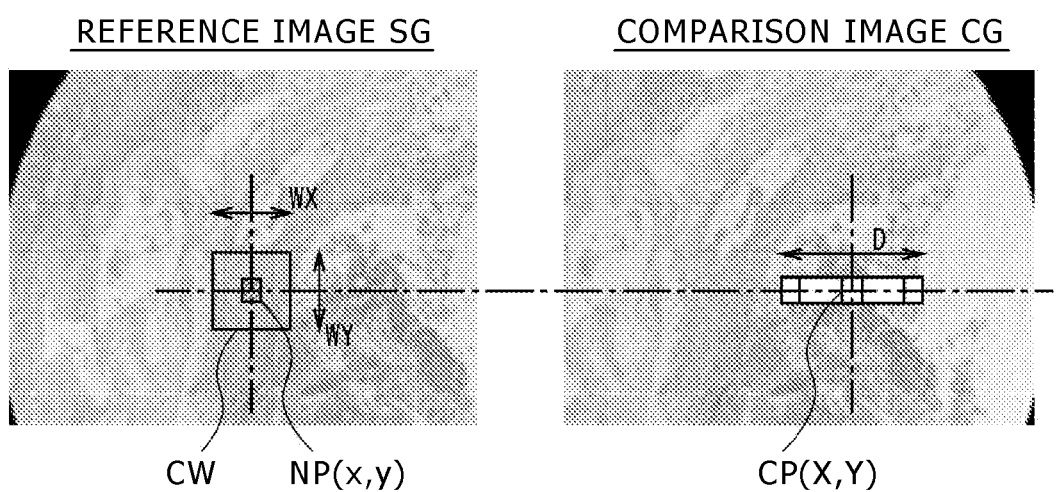
FIG. 4 is a diagram roughly showing an operation to set a detection window and a detection range.

Phase-difference images include an image referred to hereafter as a reference image SG. The reference image SG is an image which should be used as a reference. As shown in FIG. 4 which is a diagram roughly showing an operation to set a detection window and a detection range, the correlation-distribution computation section 42 sequentially selects pixels on the reference image SG as pixels which each draw attention. In the following description, pixels each drawing attention are each referred to as a pixel of interest NP.

The correlation-distribution computation section 42 sets a comparison window CW with a width WX and a height WY, which are determined in advance, in order to extract a group of pixels to be used in computation of a luminance average value for the group of pixels. The group of pixels has a center which coincides with the position of a selected pixel of interest NP. That is to say, the luminance average value is an average of the luminance levels of the pixel of interest NP and pixels surrounding the pixel of interest NP.

Then, the correlation-distribution computation section 42 sets a search range D determined in advance in the direction of the X axis. The search range D has a center which coincides with the position of a pixel CP on a comparison image CG. The position of the pixel CP on the comparison image CG corresponds to the position of the pixel of interest NP on the reference image SG. In the following description, the pixel CP on the comparison image CG is referred to as a comparison pixel CP.

Incidentally, the search range D is a range for detecting generated disparities between pixels on the comparison image CG and the pixel of interest NP on the reference image SG. The generated disparities are assumed to have a maximum value which is not greater than 100 µm. If a disparity is to be detected at 5 µm/pixel, the correlation-distribution computation section 42 sets a search range with dimensions of ±20 pixels in the direction of the X axis. This search range has a center which coincides with the position of the comparison pixel CP.

The correlation-distribution computation section 42 computes the correlation value $C(x,y,z)$ of each pixel in the search range D with respect to the pixel of interest NP in accordance with Eq. (1) given below to serve as an equation used for computing a normalized correlation value.

$$C(x, y, k) = \frac{\sum\limits_{i=-WX/2, j=-WY/2}^{i=WX/2, j=WY/2} \left\{ \begin{array}{l} (A_{(x+i,y+j)} - \overline{A_{(x,y)}}) \times \\ (B_{(X+i+k,Y+j)} - \overline{B_{(X+k,Y)}}) \end{array} \right\}}{\sqrt{\sum\limits_{i=-WX/2, j=-WY/2}^{i=WX/2, j=WY/2} (A_{(x+i,y+j)} - \overline{A_{(x,y)}}) \times} \sqrt{\sum\limits_{i=-WX/2, j=-WY/2}^{i=WX/2, j=WY/2} (B_{(X+i+k,Y+j)} - \overline{B_{(X+k,Y)}})}} \quad (1)$$

The above equation makes use of symbols which denote quantities described as follows:

x,y: The coordinates of the pixel of interest NP on the reference image SG.

X,Y: The coordinates of the comparison pixel CP on the comparison image CG.

k: The search range −D/2 to D/2 with a center coinciding with the comparison pixel CP.

$A_{(x,y)}$: The luminance value of a pixel having coordinates (x,y) on the reference image SG.

$B_{(X,Y)}$: The luminance value of a pixel having coordinates (X,Y) on the comparison image CG.

$\overline{A_{(x,y)}}$: The average of luminance values in the comparison window with its center coinciding with a pixel having coordinates (x,y) on the reference image SG.

$\overline{B_{(X,Y)}}$: The average of luminance values in the comparison window with its center coinciding with a pixel having coordinates (X,Y) on the comparison image CG.

Incidentally, let a normalized correlation be computed for the image of a semi-transparent tissue segment TS having some thickness. In this case, a depth-direction (thickness-direction) clear portion of the tissue segment TS appears on the reference image SG and the comparison image CG as clear images. Thus, the clear portion of the tissue segment TS is taken as a subject of an operation to compute a normalized correlation. It is to be noted that the clear portion of the tissue segment TS is a portion that has been clearly dyed in a dyeing process.

Figure 5:
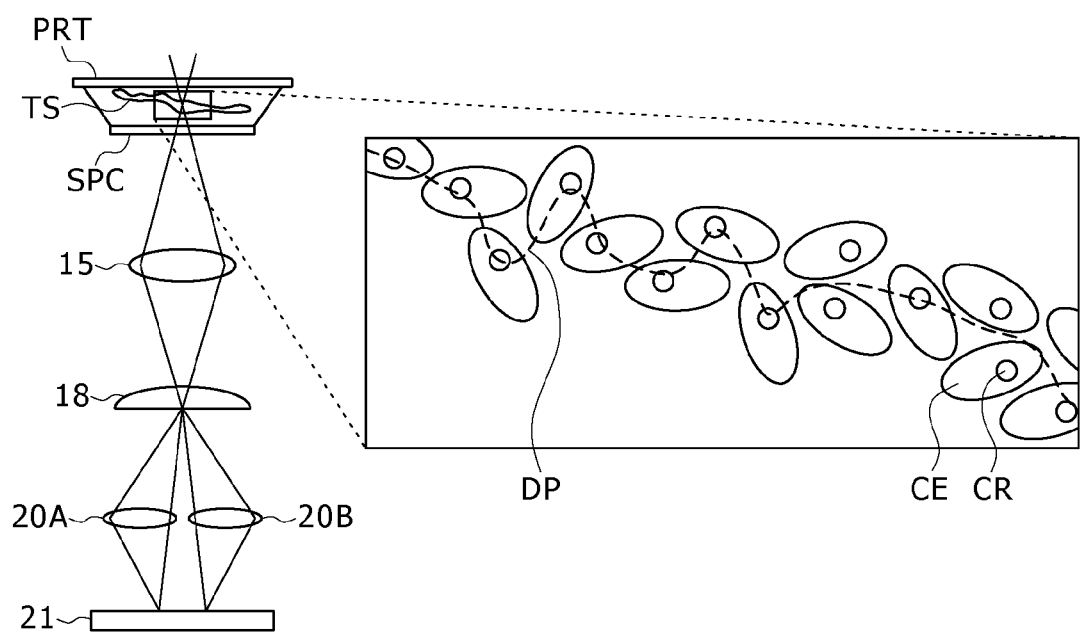
FIG. 5 is a diagram roughly showing the position of a detection surface in a tissue segment.

Accordingly, if the tissue segment TS has been subjected to an HE dyeing process, as shown in FIG. 5 which is a diagram roughly showing the position of a detection surface in a tissue segment TS, in the computation of a normalized correlation, a surface DP passing through a cell nucleus CR clearly dyed in the HE dyeing process is taken as a detection subject. In the following description, the surface passing through a cell nucleus CR clearly dyed in the HE dyeing process is referred to as a detection surface DP.

In addition, if a plurality of cell nuclei CR are lined up in the tissue segment TS in the depth direction of the tissue segment TS, in the computation of a normalized correlation, the gravity center of the cell nuclei CR, which are lined up in the tissue segment TS in the depth direction of the tissue segment TS and reflected on the reference image SG and the comparison image CG as clear images representing a clear characteristic, is taken as a detection subject. Thus, the detection surface DP passes through the gravity center.

FIG. 6A is a diagram showing a case in which only one cell nucleus exists at a position x (=x1) in the tissue segment TS in the depth direction of the tissue segment TS and two cell nuclei exist at a position x (=x2) in the tissue segment TS in the depth direction of the tissue segment TS. FIG. 6B is a diagram showing images on the reference image SG and the comparison image CG for the cell nucleus existing at the position x (=x1) whereas FIG. 6C is a diagram showing images on the reference image SG and the comparison image CG for the cell nuclei existing at the position x (=x2).

FIG. 6D is a diagram showing correlation values C in a range having a center coinciding with the position x (=x1). As shown in this diagram which serves as FIG. 6D, as results of the computation of the normalized correlation at the position x (=x1), the correlation value C at the position at which the cell nucleus CR appears on the reference image SG is greater than the correlation value C at the position at which the cell nucleus CR appears on the comparison image CG. At other positions on the reference image SG, the correlation value C decreases. This is because only one cell nucleus CR appears on each of the reference image SG and the comparison image CG. Thus, in such a case, the distribution of the correlation values C for pixels in the detection range −D/2 to D/2 has a shape in which the correlation values C for pixels at positions before and after the position of a pixel with a maximum correlation value decrease abruptly.

On the other hand, FIG. 6E is a diagram showing correlation values C in a range having a center coinciding with the position x (=x2). On the reference image SG, the two cell nuclei CR overlap each other almost completely. On the comparison image CG, on the other hand, the two cell nuclei CR are shifted slightly from each other. In such a case, as shown in FIG. 6E which is a diagram showing correlation values C in a range having a center coinciding with the position x (=x2), the correlation values C at the positions at which the two cell nuclei CR appear on the reference image SG become a maximum at the middle position between the positions at which the two cell nuclei CR appear on the comparison image CG. In addition, the two cell nuclei CR on the comparison image CG are shifted slightly from each other. Thus, at positions before and after the position at which the correlation value C reaches the maximum, the correlation value C is relatively large. As a result, the distribution of the correlation values C for pixels in the detection range −D/2 to D/2 has a shape in which the correlation values C for pixels at positions before and after the position of a pixel with a maximum correlation value change gradually.

Incidentally, the thickness of the actual tissue segment TS has a value in a range from approximately several to 20 μm. If a disparity is to be detected at 5 μm/pixel for example, a disparity for a maximum of about 4 pixels is detected. Thus, even if the two cell nuclei CR are lined up at positions separated from each other in the depth direction, the distribution correlation values C for pixels has a shape which does not represent a variation characteristic such as a characteristic having a double-peak form.

Figure 7:
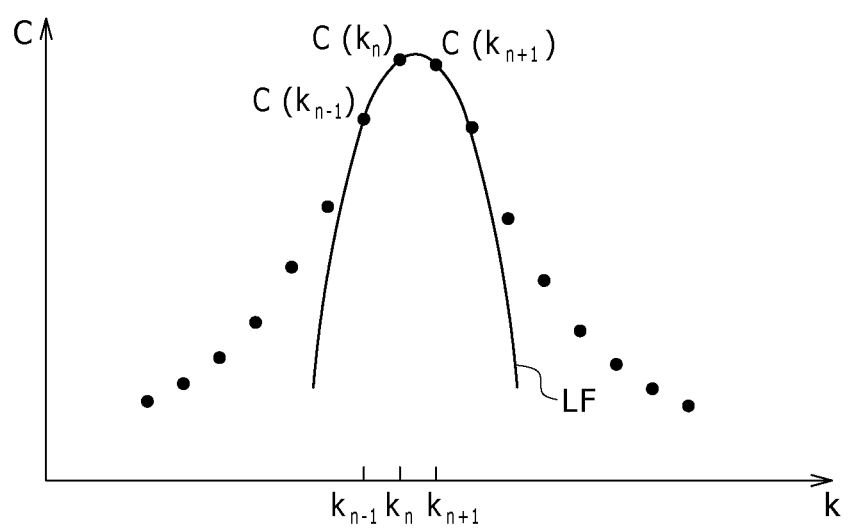
FIG. 7 is a diagram roughly showing a quadratic curve for a position at which the distribution of the correlation values shows a peak and the correlation value becomes a maximum.

As shown in FIG. 7 which is a diagram roughly showing a quadratic curve LF for a position at which the distribution of the correlation values C shows a peak and the correlation value C becomes a maximum, the correlation-distribution computation section 42 extracts a point $C(k_n)$ corresponding to a point $k_n$ on the k axis, a point $C(k_{n-1})$ corresponding to a k-axis point $k_{n-1}$ before the point $k_n$ and a point $C(k_{n-1})$ corresponding to a k-axis point $k_{n+1}$ after the point $k_n$. It is to be noted that reference notation k denotes the search range −D/2 to D/2 with a center coinciding with the comparison pixel CP whereas the point $k_n$ is a k-axis point at which the correlation value C becomes a maximum. In this case, the correlation value C is a value computed in accordance with Eq. (1).

Then, the correlation-distribution computation section 42 finds a quadratic curve LF passing through the extracted points $C(k_{n-1})$, $C(k_n)$ and $C(k_{n+1})$ as a curve which is expressed by the following equation:

$$C(k) = ak^2 + bk + c \quad (2)$$

Incidentally, in the above equation, symbol "a" denotes a second-order constant which represents the curvature of the quadratic curve LF. Symbol "b" denotes a first-order constant whereas symbol "c" denotes a zeroth-order constant.

A position $k_{max}$ is a k-axis position at which the correlation value C computed in accordance with Eq. (2) attains an extremum. In order to find the position $k_{max}$, first of all, Eq. (2) is differentiated with respect to the variable k to give an equation described below. Then, the equation is set at 0.

$$\frac{d}{dk}C(k) = 2ak + b = 0 \tag{3}$$

Subsequently, the correlation-distribution computation section 42 finds the position $k_{max}$ by computing a k value $k_{max}$ that satisfies Eq. (3) as follows.

$$k_{max} = \frac{-b}{2a} \tag{4}$$

Then, the correlation-distribution computation section 42 computes the extremum by substituting $k_{max}$ into Eq. (2) to serve as a replacement for a variable k used in the equation. Subsequently, the correlation-distribution computation section 42 computes a distance between the center of the comparison pixel CP on the comparison image CG and the extremum in order to find the disparity of the pixel of interest NP on the reference image SG. As described before, the position of the pixel CP on the comparison image CG corresponds to the position of the pixel of interest NP on the reference image SG.

Each time a pixel of interest NP is selected, the correlation-distribution computation section 42 finds the disparity of the pixel of interest NP by making use of Eqs. (1), (2) and (4). The correlation-distribution computation section 42 acquires disparity information which is a collection of computed disparities of pixels of interest NP.

The shorter the distance between the tissue segment TS and the objective lens 15, the larger the disparity. In other words, the longer the distance by which the tissue segment TS is shifted to the objective lens 15 in the forward direction of the radiated light, the larger the disparity. On the other hand, the longer the distance between the tissue segment TS and the objective lens 15, the smaller the disparity. In other words, the shorter the distance by which the tissue segment TS is shifted away from the objective lens 15 in the backward direction opposite to the propagation direction of the radiated light, the smaller the disparity. Thus, the disparity from pixels on the reference image SG corresponds to information on the unevenness state of an image taking range which is an area appearing on the image creation surface of the objective lens 15. This information on the unevenness state of the image taking range is part of information on the tissue segment TS fixed on the prepared tissue slide PRT.

Incidentally, the correlation value C computed in accordance with Eq. (1) is a correlation value of a pixel in a search range D with respect to the pixel of interest NP. Thus, the correlation value C computed in accordance with Eq. (1) is a discrete value which varies from pixel to pixel in the search range D. Accordingly, if a pixel for which the correlation value C computed in accordance with Eq. (1) is a maximum is determined to be a position corresponding to the pixel of interest NP, the distance (that is, the disparity) of a pixel for which the correlation value C for the pixel of interest NP is a maximum is detected for every pixel. If the disparity is to be detected at 5 μm/pixel for example, the detection interval of the distance (that is, the disparity) of a pixel for which the correlation value C for the pixel of interest NP is a maximum is 5 μm.

On the other hand, if the disparity of the pixel of interest NP is computed from the extremum of the quadratic curve LF for example, the detection precision is improved by about 100 times so that the disparity can be computed with a very high degree of precision in comparison with a configuration in which the disparity of the pixel of interest NP is computed on the basis of normalized correlation found in accordance with Eq. (1).

Incidentally, with the disparity detected at 5 μm/pixel for example, if the disparity of the pixel of interest NP is computed from the extremum of the quadratic curve LF, the detection interval of the disparity for the pixel of interest NP is 0.05 μm.

Then, the thickness-information acquisition section 43 computes the curvature a used in the expression on the right-hand side of Eq. (2) in accordance with Eq. (5) given as follows.

$$a = \frac{-2C(k_n) + \{C(k_{n+1}) + C(k_{n-1})\}}{2} \tag{5}$$

Here, as described above, the curvature a for the position at which the correlation value C attains the maximum changes in accordance with the thickness of the tissue segment TS. Thus, the curvature a for the position at which the correlation value C attains the maximum reflects the thickness of the tissue segment TS.

Since the second-order constant a representing the curvature of the quadratic curve LF always has a negative value, the thickness-information acquisition section 43 computes the thickness coefficient θ of the pixel of interest NP on the reference image SG in accordance with the following equation:

$$\theta = -a = \frac{2C(k_n) - \{C(k_{n+1}) + C(k_{n-1})\}}{2} \tag{6}$$

As described above, the quadratic curve LF is a curve that passes through the point $C(k_n)$, the point $C(k_{n-1})$ before the point $C(k_n)$ and the point $C(k_{n+1})$ after the point $C(k_n)$ whereas the point $C(k_n)$ is a point corresponding to the maximum of the correlation values C.

Every time a pixel of interest NP is selected, the thickness-information acquisition section 43 computes the thickness coefficient θ of the pixel of interest NP on the reference image SG by making use of Eqs. (5) and (6) and takes the thickness coefficients θ for the pixels on the reference image SG as thickness information.

The thicker the tissue segment TS, the smaller the thickness coefficient θ. In other words, the thinner the tissue segment TS, the larger the thickness coefficient θ.

Figure 8:
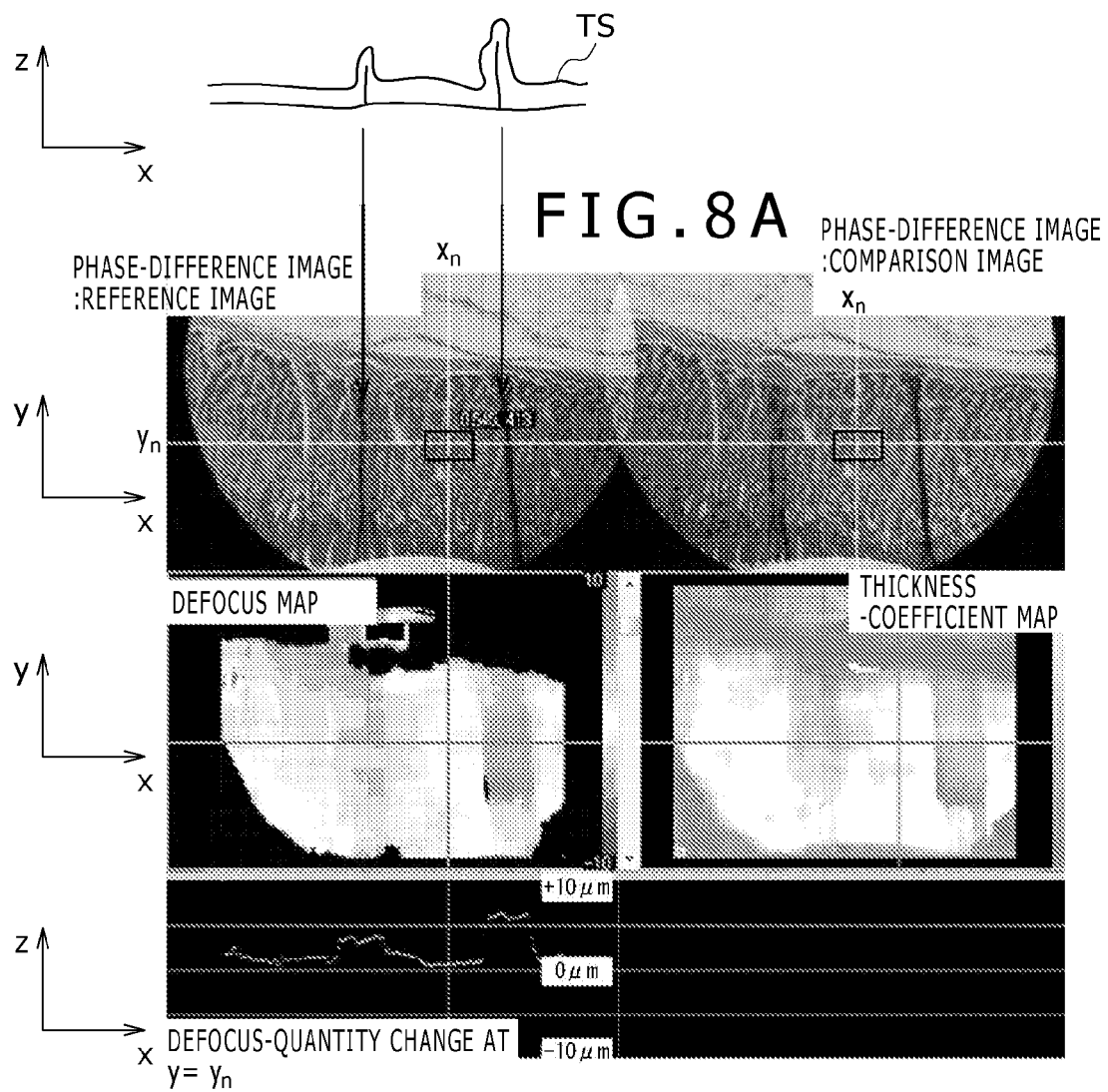
FIGS. 8A and 8B are a plurality of diagrams roughly showing results of computation for a phase-difference image.

FIG. 8A is a cross-sectional diagram showing a phase-difference image of a tissue segment TS with mutually overlapping surfaces at two locations separated away from each other in the direction of the X axis whereas FIG. 8B is a diagram showing a defocus map, defocus-quantity changes at y=yn and a thickness-coefficient map.

The defocus map shown in FIG. 8B is obtained by giving a color to disparities, which are obtained as a result of computation based on Eq. (4) for pixels of the reference image SG, in accordance with distances from a position determined in advance. The concentrations of the color represent the positions of the detection surface in the direction of the Z axis, that is, the higher the concentration of the color, the longer the distance by which the detection surface is shifted in the Z-axis direction which is the direction toward the front side. The defocus-quantity changes also shown in FIG. 8B are disparities lined up along a straight line passing through the position $y=y_n$ in a direction parallel to the X axis. The thickness-coefficient map also shown in FIG. 8B is obtained by giving a color to thickness coefficients θ which are obtained as a result of computation based on Eq. (6) for pixels of the reference image SG. The concentrations of the color represent the thickness coefficients θ, that is, the higher the concentration of the color, the smaller the thickness coefficient θ.

As is obvious from FIG. 8B, at each of the two positions of the mutually overlapping surfaces, the tissue segment TS is thick so that, as the detection surface is shifted in the direction to the front side, the thickness coefficient θ decreases.

As described above, by making use of Eqs. (4) and (6), the microscope 1 is capable of acquiring the disparity (that is, the defocus quantity) and the thickness coefficient θ at every pixel on the reference image SG in a phase-difference image from one phase-difference image, i.e., the phase-difference image.

Incidentally, in FIG. 8B, a black portion outside the defocus map is an area for which a disparity cannot be computed due to an error. By the same token, a black portion outside the thickness-quantity map is an area for which the thickness coefficient θ cannot be computed due to an error.

On the basis of disparity information, the overall control section 30 determines an in-focus position defined as a position at which the focal-distance point of the objective lens 15 is to be adjusted for a detection surface.

Subsequently, the overall control section 30 supplies information on the in-focus position to the stage-driving control section 31 which then computes a movement distance of the focal-distance point of the objective lens 15 for the in-focus position. Then, the stage-driving control section 31 moves the stage 11 to a position corresponding to the computed movement distance.

In addition, on the basis of thickness information, the overall control section 30 determines a plurality of layers to be accommodated in the picture taking subject depth of the objective lens 15. For example, the overall control section 30 determines a plurality of layers to be accommodated in the image-taking subject depth of the objective lens 15 in accordance with the thickness of the tissue segment TS in the image taking range. In the following description, such a layer is referred to as an image taking layer.

Subsequently, the overall control section 30 supplies information on the image taking layers to the stage-driving control section 31 which then computes a movement distance of the focal-distance point of the objective lens 15 for each of the image taking layers. Then, the stage-driving control section 31 moves the stage 11 to a position corresponding to the computed movement distance.

Every time the stage-driving control section 31 moves the stage 11 to a position corresponding to a movement distance computed for an image taking layer, the overall control section 30 drives the image-taking control section 33 to acquire an image of a member of the tissue segment TS fixed on the prepared tissue slide PRT.

The overall control section 30 determines the number of image taking layers in the image taking range on the basis of thickness information. To put it in detail, if the tissue segment TS is thick at that position, the overall control section 30 increases the number of image taking layers. If the tissue segment TS is thin at that position, on the other hand, the overall control section 30 decreases the number of image taking layers. Thus, in accordance with the thickness of the tissue segment TS, the overall control section 30 is capable of setting the number of image taking layers at an optimum value which neither spills image taking layers of the tissue segment TS nor requires an unnecessary image taking operation to be carried out wastefully. As a result, the time it takes to carry out image taking operations can be shortened and the amount of data can be reduced.

1-3. Thickness-Information Acquisition Processing Procedure

Figure 9:
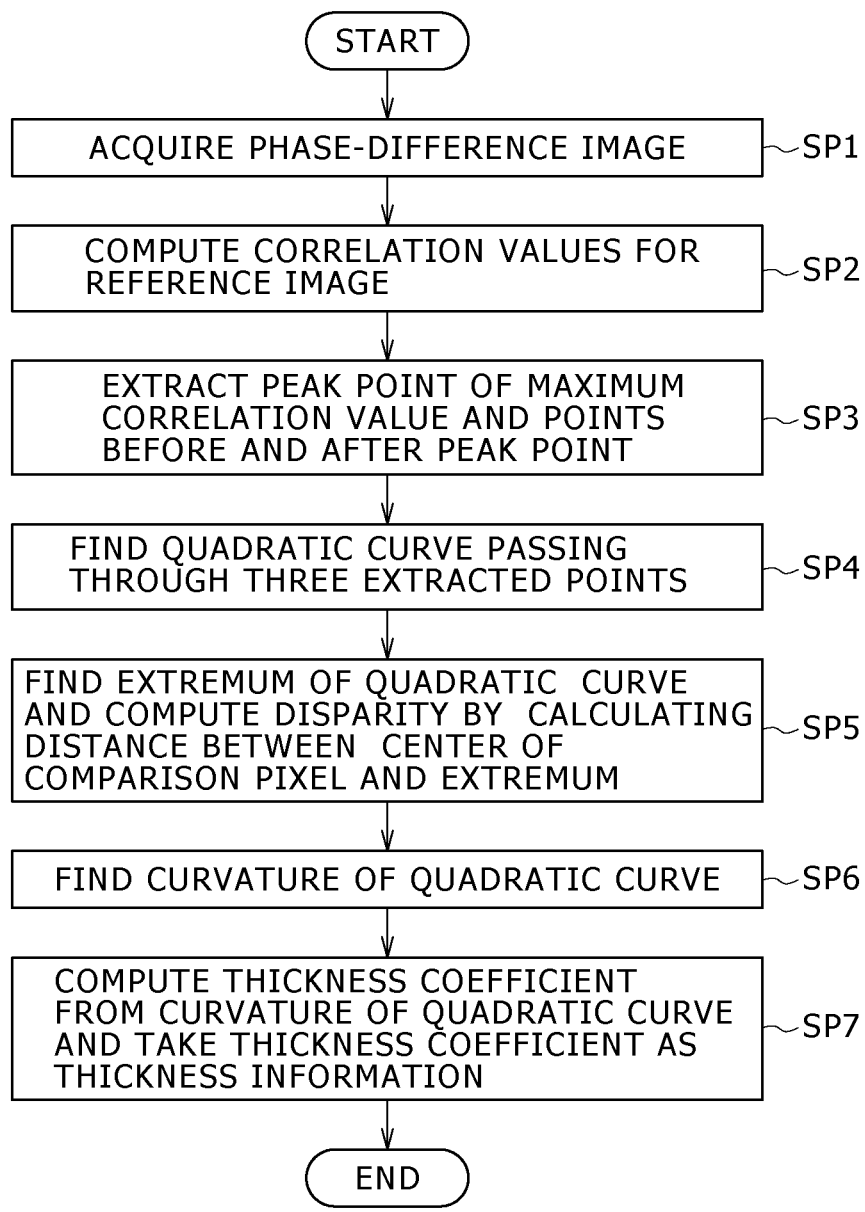
FIG. 9 shows a flowchart representing the procedure of thickness information acquisition processing.

FIG. 9 shows a flowchart representing the procedure of thickness information acquisition processing. By referring to this flowchart, the following description explains the procedure for carrying out processing to acquire thickness information explained before.

A program executed by the overall control section 30 to carry out the procedure of the processing to acquire thickness information is referred to as a routine RT1. In actuality, after completing a start step of the routine RT1, the overall control section 30 carries out a step SP1 in order to acquire a phase-difference image created by the image taking device 21 from the phase-difference image-taking control section 34 which obtains the phase-difference image from the image taking device 21. Then, the procedure goes on to a step SP2.

At the step SP2, the overall control section 30 computes correlation values C for pixels of the reference image SG from the phase-difference image in accordance with Eq. (1). Then, the procedure goes on to a step SP3.

At the step SP3, the overall control section 30 extracts a point $C(k_n)$ corresponding to the maximum of the correlation values C. The overall control section 30 also extracts a point $C(k_{n-1})$ before the point $C(k_n)$ and a point $C(k_{n+1})$ after the point $C(k_n)$. Then, the procedure goes on to a step SP4.

At the step SP4, the overall control section 30 finds a quadratic curve LF passing through the three extracted points. The quadratic curve LF is a curve representing Eq. (2). Then, the procedure goes on to a step SP5. At the step SP5, the overall control section 30 finds the extremum of the quadratic curve LF by making use of Eq. (4). The overall control section 30 takes the extremum as disparity information. Then, the procedure goes on to a step SP6.

At the step SP6, the overall control section 30 finds the curvature a of the quadratic curve LF by making use of Eq. (5). Then, the procedure goes on to a step SP7. At the step SP7, the overall control section 30 computes a thickness coefficient θ from the curvature a of the quadratic curve LF by making use of Eq. (6) and takes the thickness coefficient θ as thickness information. Then, the procedure goes on to the next step to terminate the processing to acquire thickness information.

1-4. Operations and Effects

In the configuration described above, the microscope 1 computes correlation values C of the search range D on the comparison image CG with respect to pixels of the reference image SG in a phase-difference image taken by the image taking device 21 as a phase-difference image of the tissue segment TS and acquires thickness information of the tissue segment TS on the basis of the state of distribution of the correlation values C.

Thus, in the case of a tissue segment TS already subjected to an HE dyeing process for example, the microscope 1 is capable of acquiring thickness information for the tissues existing in the depth direction as tissues already subjected to the dyeing process from one phase-difference image. That is to say, the microscope 1 is capable of acquiring the thickness information in one image taking operation. As a result, the microscope 1 is capable of acquiring the thickness information of the tissue segment TS in a short period of time.

In addition, since the microscope 1 is capable of acquiring thickness information reflecting the distribution for the tissue already subjected to the dyeing process, the microscope 1 is capable of acquiring the thickness information with a high degree of precision.

In comparison with a configuration in which the information on the thickness of the tissue segment TS is acquired by shifting the focal-distance point of the objective lens in the depth direction of the tissue segment TS, the microscope 1 never obtains a discrete value. Thus, the microscope 1 is capable of acquiring the thickness information with a high degree of precision.

Figure 10:
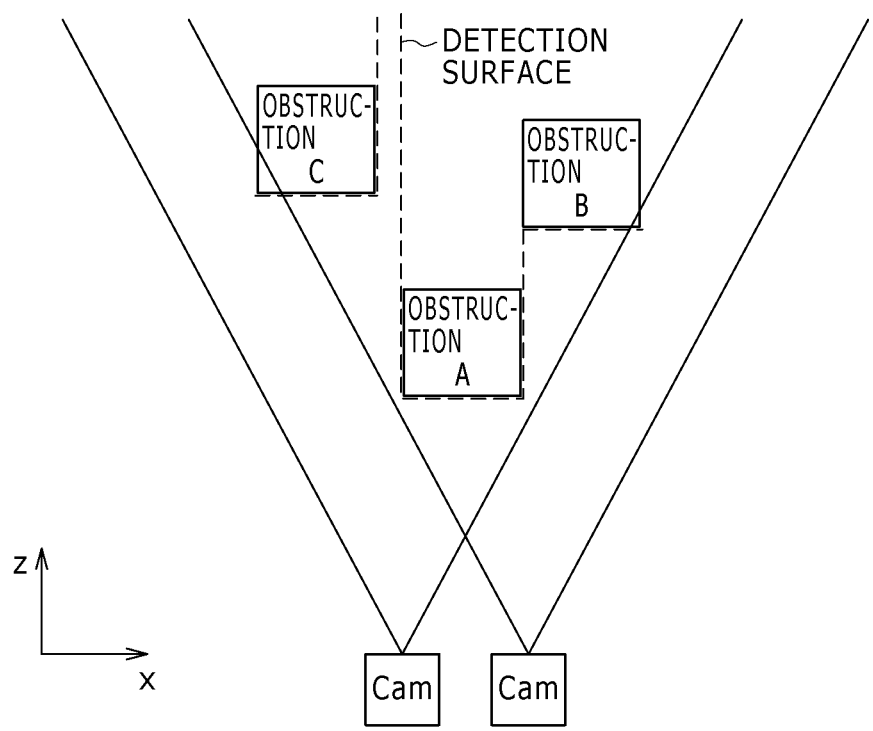
FIG. 10 is a diagram roughly showing ordinary stereo cameras.

Incidentally, in the case of ordinary stereo cameras, in some cases, a specific one of the cameras can be used to take an image of a subject (which can be a real picture taking subject or an obstruction) but the other camera cannot be used to take an image of the subject due to existence of another subject (which can be another real picture taking subject or another obstruction) in front of the other camera as is the case with a layout shown in FIG. 10 which is a diagram roughly showing a layout of the ordinary stereo cameras and obstructions.

In the case shown in FIG. 10, an image taken by the specific camera is different from an image taken by the other camera. If correlation values are computed by making use of the image taken by the specific camera and the image taken by the other camera, the correlation values cannot be computed with a high degree of precision. In addition, in the case of ordinary stereo cameras, even though distances (that is, disparities) from the stereo cameras to a subject (or an obstruction) can be acquired, information on the thickness of the subject (or the obstruction) cannot be obtained.

In the case of the microscope 1, on the other hand, the tissue segment TS is semi-transparent. Thus, in the phase-difference image, the subject of the reference image SG is the same as the subject of the comparison image CG. As a result, correlation values can be computed with a high degree of precision and, in addition, thickness information can also be acquired as well.

In addition, the microscope 1 extracts a point $C(k_n)$ corresponding to the maximum of the correlation values C each computed as a normalized correlation. The microscope 1 also extracts a point $C(k_{n-1})$ before the point $C(k_n)$ and a point $C(k_{n+1})$ after the point $C(k_n)$. Then, the microscope 1 finds a quadratic curve LF passing through the three extracted points. Finally, the microscope 1 acquires thickness information according to the curvature a of the quadratic curve LF.

Thus, since the microscope 1 finds the quadratic curve LF, the resolution of the correlation values C represented by the quadratic curve LF is improved. That is to say, since the microscope 1 acquires thickness information according to the curvature a of the quadratic curve LF representing correlation values C at an improved resolution, the microscope 1 is capable of acquiring thickness information with a higher degree of precision.

In accordance with the configuration described above, a distribution of correlations with respect to a reference image of an acquired phase-difference image is found. Then, information on the thickness of the tissue segment TS is found in accordance with the distribution of correlations. Thus, information on the thickness of the tissue segment TS can be found from one phase-difference image. In addition, it is also possible to acquire thickness information reflecting a distribution in the direction of the thickness of the sample. That is why the information on the thickness of the tissue segment TS can be found in a short period of time with a high degree of precision.

2. Other Embodiments

In the case of the embodiment described so far, a tissue segment TS is taken as the sample. However, implementations of the present application are by no means limited to the embodiment in which the sample is a tissue segment TS. For example, a living substance such as a cell or a dyed material can also be taken as a sample. In the following description, a living-substance sample is referred to as a biological sample. However, the sample has to be a transparent sample transmitting visible light or a sample transmitting light, which is generated in the sample, through the inside of the sample itself. A biological sample already subjected to a dyeing process making use of fluorescent light is a typical example of the sample transmitting light, which is generated in the sample, through the sample itself.

In the case of the embodiment described so far, two separator lenses (that is, the separator lenses 20A and 20B) are used. However, the number of aforementioned separator lenses is by no means limited to two as is the case with the embodiment. For example, the pair consisting of the separator lenses 20A and 20B can also be taken as a unit or a separator-lens set and the microscope may also employ a plurality of units which each consist of two separator lenses. In such a configuration, the diaphragm mask 19 has apertures each provided for one of the separator lenses 20 included in such units.

In the case of the embodiment described so far, data of a phase-difference image taken by the image taking device 21 is acquired. However, implementations of the present application are by no means limited to the embodiment. For example, data of a difference-phase image can also be acquired from a data provider connected to the Internet or another network. As another alternative, data of a difference-phase image can also be acquired from a recording medium determined in advance.

In the case of the embodiment described so far, information on the thickness of a tissue segment TS already subjected to an HE dyeing process is acquired. Correlation values C are computed in accordance with Eq. (1) by taking a clearly dyed tissue as a subject of detection. However, implementations of the present application are by no means limited to the embodiment. For example, correlation values C can also be computed by taking a cell film as a subject of detection. In this case, the cell film is a clearly dyed film in the tissue segment TS. That is to say, by selectively determining the type of the dyeing process, the subject of detection can also be selectively determined as well.

In the case of the embodiment described so far, thickness information is acquired by making use of the curvature a of a quadratic curve LF having curvatures matching each other at an inflection point, a point before the inflection point and a point after the inflection point. However, implementations of the present application are by no means limited to the embodiment. For example, in an alternative configuration, first of all, another approximation curve representing correlation values C each computed as a normalized correlation is found. Then, an independent curvature at each of an extremum point on the approximation curve, a point before the extremum point and a point after the extremum point is found. Finally, in accordance with the curvatures, pieces of thickness information in the forward and backward directions of the detection surface are acquired independently.

In the case of the embodiment described so far, thickness information is acquired by making use of the curvature a of a quadratic curve LF passing through the point $C(k_n)$ corresponding to the maximum of the correlation values C each computed as a normalized correlation, the point $C(k_{n-1})$ before the point $C(k_n)$ and the point $C(k_{n+1})$ after the point $C(k_n)$. However, implementations of the present application are by no means limited to the embodiment. For example, in an alternative configuration, first of all, another approximation curve representing correlation values C each computed as a normalized correlation is found. Then, thickness information according to the curvature of the other approximation curve is computed.

In the case of the embodiment described so far, each of correlation values C is computed as a normalized correlation. However, implementations of the present application are by no means limited to the embodiment. For example, it is also possible to carry out processing such as SAD (Sum of Absolute Differences) processing or SSD (Sum of Squared Differences) processing as correlation processing.

In the case of the embodiment described so far, image taking layers in an image taking range are determined on the basis of thickness information. However, implementations of the present application are by no means limited to the embodiment. For example, the thickness of a tissue segment TS in the image taking range is computed on the basis of thickness information. Then, the picture-taking subject depth of the objective lens 15 is adjusted so that the entire tissue segment TS can be accommodated. Finally, the image of one tissue segment TS is taken.

In the case of the embodiment described so far, one objective lens 15 having a magnifying power determined in advance is provided. However, implementations of the present application are by no means limited to the embodiment. For example, it is also possible to provide a configuration in which a plurality of objective lenses having magnification powers different from each other are provided.

In the case of the embodiment described so far, the half mirror 17 splits incident light coming from the objective lens 15 into transmitted light propagating to the image taking device 16 through a transmission side of the half mirror 17 and reflected light propagating to image taking device 21 through a reflection side of the half mirror 17. However, implementations of the present application are by no means limited to the embodiment. For example, it is also possible to provide a configuration in which, as a substitute for the half mirror 17, a new mirror and a mirror-up mechanism can also be provided.

In the configuration described above, in a process of creating a phase-difference image on the image taking device 21, the new mirror is placed on an optical path between the objective lens 15 and the image taking device 16. Light reflected by the new mirror is guided to the image taking device 21. In a process of creating an image on the image taking device 16, on the other hand, the mirror-up mechanism removes the new mirror from the optical path between the objective lens 15 and the image taking device 16. With the new mirror removed from the optical path between the objective lens 15 and the image taking device 16, light coming from the objective lens 15 is guided to the image taking device 16.

In the configuration described above, the overall control section 30 executes a thickness-information acquisition processing program, which has already been stored in advance in the HDD, in order to carry out the thickness-information acquisition processing explained earlier. However, implementations of the present application are by no means limited to the embodiment. For example, the thickness-information acquisition processing program can also be stored in advance in the ROM. As an alternative, the thickness-information acquisition processing program can also be installed into the microscope 1 from a recording medium or downloaded from a program provider connected to the Internet. Also in any of these cases, in order to carry out the thickness-information acquisition processing, the overall control section 30 executes the thickness-information acquisition processing program stored in advance in the ROM, installed into the microscope 1 from a recording medium or downloaded from a program provider connected to the Internet. As another alternative, in order to carry out the thickness-information acquisition processing, the overall control section 30 executes the thickness-information acquisition processing program downloaded to the microscope 1 through any of a variety of different routes.

In the configuration described above, the phase-difference image acquisition section 41, the correlation-distribution computation section 42 and the thickness-information acquisition section 43 function as an image acquisition section, a correlation-distribution computation section and a thickness-information acquisition section respectively. However, implementations of the present application are by no means limited to the embodiment. For example, the configuration of each of the image acquisition section, the correlation-distribution computation section and the thickness-information acquisition section can also be changed in a variety of ways.

The present application can be applied to a variety of bio industries. For example, the present application can be applied to biological experiments, manufacturing of medical drugs as well as medicines and observations of progress made by patients.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A thickness-information acquisition apparatus comprising:
an image acquisition section configured to acquire a phase-difference image of a sample;
a correlation-distribution computation section configured to compute a correlation distribution of an image in said phase-difference image with respect to pixels of another image in said phase-difference image;
a thickness-information acquisition section configured to acquire information on a thickness of said sample in accordance with said correlation distribution; and
a control section configured to determine a number of image taking layers to image the sample based on the determined thickness of the sample, the number of image taking layers being proportional to the determined thickness of the sample,
wherein said thickness-information acquisition section is at least further configured to:
compute a curvature at a preceding position preceding a peak position at which said correlation distribution shows a maximum correlation and a curvature at a succeeding position succeeding said peak position; and separately acquire said information on the thickness of said sample for said preceding position in accordance with said curvature computed for said preceding position, and said information on the thickness of said sample for said succeeding position in accordance with said curvature computed for said succeeding position, and wherein the correlation distribution is a quadratic distribution and the information regarding the thickness of the sample is based on a peak of the quadratic distribution.

2. The thickness-information acquisition apparatus according to claim 1, wherein said thickness-information acquisition section computes a curvature at a position at which said correlation distribution shows a maximum correlation and acquires said information on the thickness of said sample in accordance with the magnitude of said curvature.

3. The thickness-information acquisition apparatus according to claim 1, wherein said phase-difference image includes images of a biological sample.

4. A thickness-information acquisition method comprising:
acquiring a phase-difference image of a sample;
computing a correlation distribution of an image in said phase-difference image with respect to pixels of another image in said phase-difference image;
acquiring information on a thickness of said sample in accordance with said correlation distribution; and
determining a number of image taking layers to image the sample based on the determined thickness of the sample, the number of image taking layers being proportional to the determined thickness of the sample,
wherein the thickness-information acquisition method at least further includes:
computing a curvature at a preceding position preceding a peak position at which said correlation distribution shows a maximum correlation and a curvature at a succeeding position succeeding said peak position; and
separately acquiring said information on the thickness of said sample for said preceding position in accordance with said curvature computed for said preceding position, and said information on the thickness of said sample for said succeeding position in accordance with said curvature computed for said succeeding position, and
wherein the correlation distribution is a quadratic distribution and the information regarding the thickness of the sample is based on a peak of the quadratic distribution.

5. A non-transitory computer readable storage medium storing a thickness-information acquisition program, which when executed, cause a computer to execute:
an image acquisition step of acquiring a phase-difference image of a sample;
a correlation-distribution computation step of computing a correlation distribution of an image in said phase-difference image with respect to pixels of another image in said phase-difference image;
a thickness-information acquisition step of acquiring information on the thickness of said sample in accordance with said correlation distribution; and
a control step of determining a number of image taking layers to image the sample based on the determined thickness of the sample, the number of image taking layers being proportional to the determined thickness of the sample,
wherein said thickness-information acquisition step at least further includes:
computing a curvature at a preceding position preceding a peak position at which said correlation distribution shows a maximum correlation and a curvature at a succeeding position succeeding said peak position; and
separately acquiring said information on the thickness of said sample for said preceding position in accordance with said curvature computed for said preceding position, and said information on the thickness of said sample for said succeeding position in accordance with said curvature computed for said succeeding position, and
wherein the correlation distribution is a quadratic distribution and the information regarding the thickness of the sample is based on a peak of the quadratic distribution.

6. A microscope comprising:
a mirror for splitting incident light coming from an objective lens into transmitted light propagating through the transmission side of said mirror and reflected light propagating through the reflection side of said mirror;
a first image taking device for taking an image projected by said objective lens on said transmission side of said mirror or said reflection side of said mirror to serve as an image of a picture taking subject so as to let said objective lens create said image of said picture taking subject on said first image taking device;
a pair of apertures provided behind said mirror at positions on said reflection side of said mirror or positions on said transmission side of said mirror to serve as a unit consisting of said apertures whose sizes can be adjusted so as to provide a picture taking subject depth greater than the picture taking subject depth of said objective lens;
separator lenses provided behind said apertures respectively at positions on said reflection side of said mirror or positions on said transmission side of said mirror to serve as separator lenses for creating a phase-difference image of a sample for a planned created image surface of said picture taking subject image projected by said objective lens on said reflection side of said mirror or said transmission side of said mirror;
a second image taking device for making use of said planned created image surface as an image taking surface;
an image acquisition section configured to acquire said phase-difference image of said sample from said second image taking device;
a correlation-distribution computation section configured to compute a correlation distribution of an image in said phase-difference image with respect to pixels of another image in said phase-difference image;
a thickness-information acquisition section configured to acquire information on a thickness of said sample in accordance with said correlation distribution; and
a control section configured to determine a number of image taking layers for the first imaging taking device to image the sample based on the determined thickness of the sample, the number of image taking layers being proportional to the determined thickness of the sample,
wherein said thickness-information acquisition section is at least further configured to:
computes a curvature at a preceding position preceding a peak position at which said correlation distribution shows a maximum correlation and a curvature at a succeeding position succeeding said peak position; and
separately acquires said information on the thickness of said sample for said preceding position in accordance with said curvature computed for said preceding position, and said information on the thickness of said sample for said succeeding position in accordance with said curvature computed for said succeeding position, and wherein the correlation distribution is a quadratic distribution and the information regarding the thickness of the sample is based on a peak of the quadratic distribution.

7. A thickness-information acquisition apparatus comprising:

image acquisition means for acquiring a phase-difference image of a sample;

correlation-distribution computation means for computing a correlation distribution of an image in said phase-difference image with respect to pixels of another image in said phase-difference image;

thickness-information acquisition means for acquiring information on the thickness of said sample in accordance with said correlation distribution; and a control section configured to determine a number of image taking layers to image the sample based on the determined thickness of the sample, the number of image taking layers being proportional to the determined thickness of the sample, wherein said thickness-information acquisition means at least further includes:

computing a curvature at a preceding position preceding a peak position at which said correlation distribution shows a maximum correlation and a curvature at a succeeding position succeeding said peak position; and separately acquiring said information on the thickness of said sample for said preceding position in accordance with said curvature computed for said preceding position, and said information on the thickness of said sample for said succeeding position in accordance with said curvature computed for said succeeding position, and wherein the correlation distribution is a quadratic distribution and the information regarding the thickness of the sample is based on a peak of the quadratic distribution.

8. The thickness-information acquisition apparatus according to claim 1, wherein the thickness of said sample is distinct from a distance to said sample.

9. The thickness-information acquisition apparatus according to claim 1, wherein the number of image taking layers is determined such that less time is used imaging relatively thin samples compared to relatively thick samples.

10. The thickness-information acquisition apparatus according to claim 1, wherein the control section is configured to determine that a first number of image taking layers are to be imaged when the sample is relatively thin and a second number of image taking layers are to be imaged when the sample is relatively thick, the first number being less than the second number.

11. The thickness-information acquisition apparatus according to claim 1, wherein the control section is configured to determine the number of image taking layers to image the sample for a same perspective of the sample.

* * * * *